(12) United States Patent
Beaujot et al.

(10) Patent No.: US 8,757,073 B2
(45) Date of Patent: Jun. 24, 2014

(54) METERING ASSEMBLY FOR AN AIR SEEDER

(75) Inventors: Patrick M. Beaujot, Langbank (CA); Richard L. Russett, Boggy Creek (CA); Robert J. Higgins, Whitewood (CA); Kenneth M. Dlugan, Wawota (CA); Dave Hundeby, Saskatoon (CA); David R. Duke, Langbank (CA); Bruce W. Wilton, Langbank (CA)

(73) Assignee: One Pass Implements Inc., Langbank (CA)

( * ) Notice: Subject to any disclaimer, the term of this patent is extended or adjusted under 35 U.S.C. 154(b) by 488 days.

(21) Appl. No.: 13/014,531

(22) Filed: Jan. 26, 2011

(65) Prior Publication Data

US 2011/0179984 A1   Jul. 28, 2011

Related U.S. Application Data

(60) Provisional application No. 61/299,247, filed on Jan. 28, 2010.

(51) Int. Cl.
   *A01C 7/00*   (2006.01)
(52) U.S. Cl.
   USPC ........................................ 111/175; 198/371.1
(58) Field of Classification Search
   USPC .................. 111/174, 175; 239/655, 654, 675; 198/371.1, 436, 459.4
   See application file for complete search history.

(56) References Cited

U.S. PATENT DOCUMENTS

| 3,428,027 | A | * | 2/1969 | Haen et al. ................... 119/57.6 |
| 3,519,169 | A | * | 7/1970 | Holland ......................... 222/626 |
| 3,559,893 | A | * | 2/1971 | Gruben .......................... 239/664 |
| 3,631,825 | A | * | 1/1972 | Weiste .......................... 111/101 |
| 4,480,794 | A | * | 11/1984 | Fuss et al. ..................... 239/654 |
| 4,562,968 | A | * | 1/1986 | Widmer et al. ............... 239/655 |
| 5,028,009 | A | * | 7/1991 | Takata ........................... 239/655 |
| 5,178,333 | A | * | 1/1993 | Barber et al. ................. 239/655 |
| 5,299,888 | A | * | 4/1994 | Wysong et al. ................ 406/67 |
| 5,826,523 | A | * | 10/1998 | Gregor .......................... 111/181 |
| 6,283,679 | B1 | | 9/2001 | Gregor et al. |
| 6,786,435 | B2 | * | 9/2004 | Mishra .......................... 239/677 |
| 6,834,599 | B1 | | 12/2004 | Fuessel et al. |
| 7,104,207 | B2 | * | 9/2006 | Wake et al. ................... 111/170 |
| 2009/0079624 | A1 | * | 3/2009 | Dean et al. ............... 342/357.07 |

FOREIGN PATENT DOCUMENTS

CA   2503174   4/2006

* cited by examiner

*Primary Examiner* — Jamie L McGowan
(74) *Attorney, Agent, or Firm* — Bennett Jones LLP

(57) ABSTRACT

A metering assembly is provided for use with an air seeding system for delivering one or more particulate materials to an air seeding apparatus, the air seeding system comprising a product tank, configured to hold a particulate material and having an outlet, the metering assembly comprising at least one metering device, the metering device having a housing, an inlet positioned in the housing to receive particulate material from the outlet of the product tank, a first loading zone and a second loading zone, and a flow controller provided beneath the inlet and operative to route particulate material that has entered the metering device through the inlet in a first direction towards the first loading zone and in a second direction towards the second loading zone.

25 Claims, 9 Drawing Sheets

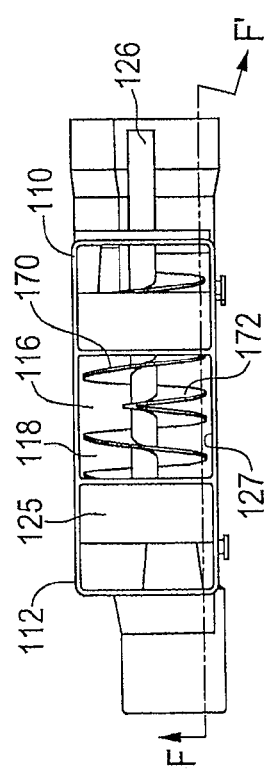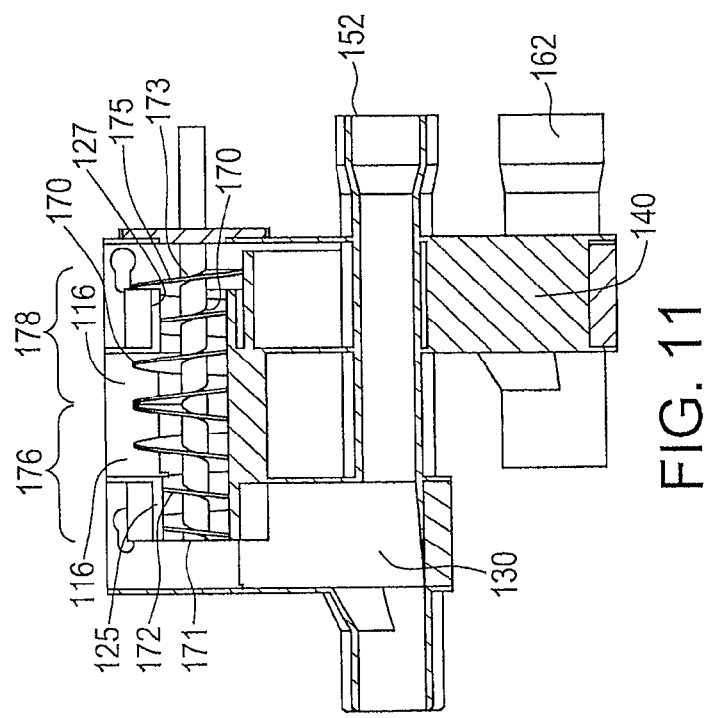

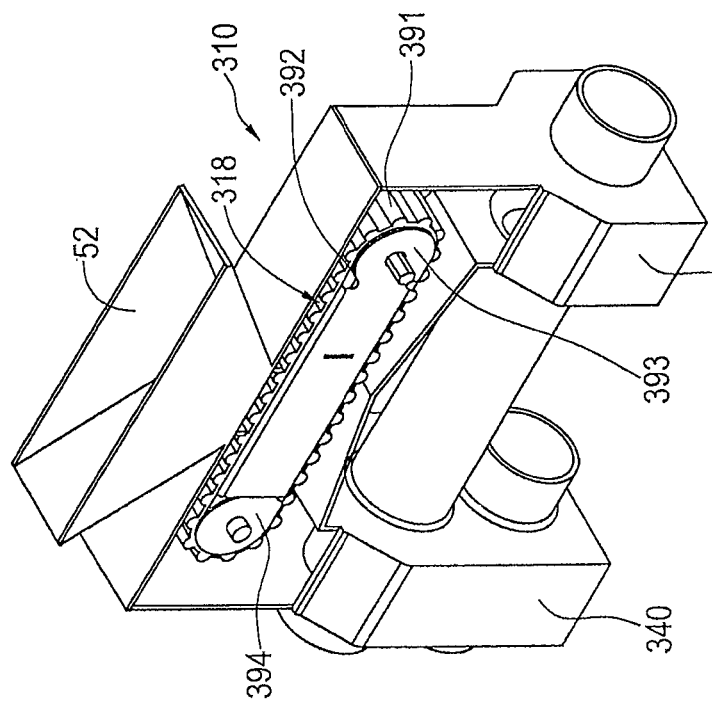
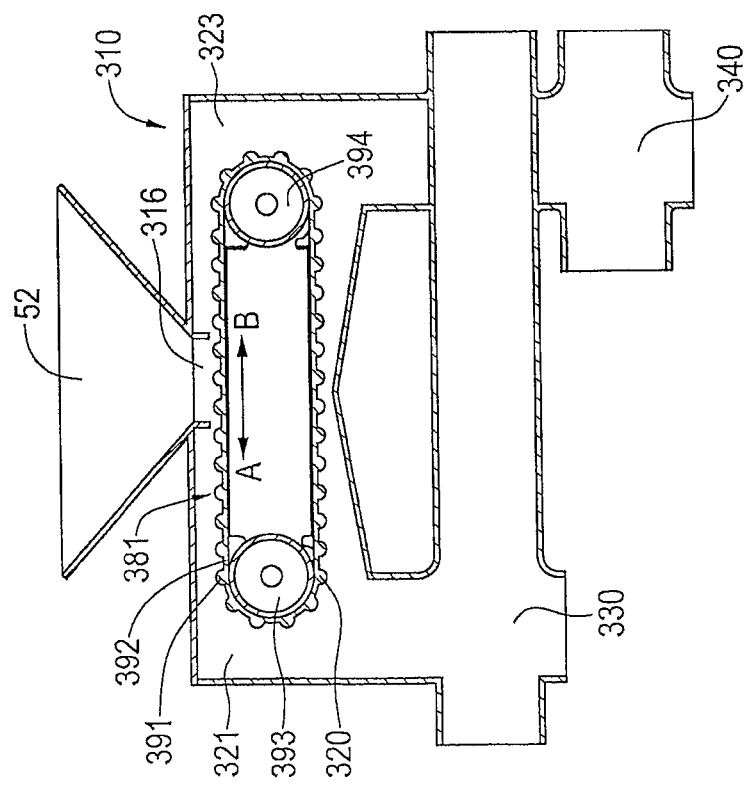

METERING ASSEMBLY FOR AN AIR SEEDER

This application claims the benefit of U.S. Provisional Patent Application No. 61/299,247, filed Jan. 28, 2010.

FIELD OF THE INVENTION

The present invention relates to metering devices for air seeding systems and more particularly to a metering device and assembly that allows particulate material, such as seeds and fertilizer, to be selectively routed to a number of distribution lines and subsequently to an air seeder.

BACKGROUND OF THE INVENTION

In many agricultural applications, particulate materials, such as seed, fertilizer, inoculants and other seed treatments are applied to a field in controlled amounts either simultaneously or at different times. The amounts of these particulate materials must be carefully metered and controlled because the amount of particulate material that reaches the ground is usually critical in order to optimize crop yields. Additionally, these particulate materials often constitute costly inputs to an agricultural farm and it is often very beneficial and cost effective to efficiently make use of the this particulate material.

Typically, a product tank is used to hold the particulate material to be deposited into the ground. Often these tanks contain a number of compartments so that a single product tank can hold more than one type of particulate material (e.g. one compartment can contain seed while another contains fertilizer). The product tank dispenses the particulate to a metering device that controls the amount of the particulate material that is being routed to an air seeding apparatus by an air distribution system, where the particulate material will typically be deposited into a furrow that has been formed in the ground. The metering device is used to try and control the amount of particulate material that reaches the air seeding apparatus.

These multiple compartment product carts allow more than one type of particulate material (e.g. both seed and fertilizer) to be deposited into the ground during a single pass. Previously, air seeding systems using product carts with multiple compartments came in double shoot and even triple shoot configurations. The double shoot configuration was used for products carts with two separate compartments and the triple shoot configuration was used for products carts with three separate compartments. The double and triple shoot configurations allowed two and three types of particulate material, respectively, to be supplied and deposited into the ground by an air seeding system during a single pass. These systems use two or three separate sets of distribution lines to route the various types of particulate material to be deposited into the ground with each compartment in the product tank having its own set of distribution lines connected to the metering device on that compartment and therefore each set of distribution lines carrying one type of particulate material.

More recently, some manufactures have developed metering assemblies that can selectively supply particulate material from a compartment of a product cart to either of a first set of distribution lines or a second set of distribution lines. This allows a user to configure their air seeding system depending on the specific requirements for a single field. For example, one compartment can be filled with seed and routed to the first set of distribution lines while a second compartment can be filled with fertilizer and routed to a second set of distribution lines. Alternatively, both compartments may be filled with seed and the metering assemblies on both compartments set to route the seed to only the first set of distribution lines or the only the second set of distribution lines.

However, many of these systems require complex diverter valves and linkages making their operation mechanically complex. Additionally, in some cases it is desirable to have a metering device that can relatively quickly prevent particulate material from being dispensed from a product cart or even allowing the flow of particulate material to certain sections of the air seeding system to be stopped.

SUMMARY OF THE INVENTION

In a first aspect, a metering assembly for use with an air seeding system for delivering one or more particulate materials to an air seeding apparatus, the air seeding system comprising a product tank, configured to hold a particulate material and having an outlet, the metering assembly comprising:
at least one metering device, the metering device having a housing, an inlet positioned in the housing to receive particulate material from the outlet of the product tank, a first loading zone and a second loading zone, and a flow controller provided beneath the inlet and operative to route particulate material that has entered the metering device through the inlet in a first direction towards the first loading zone and in a second direction towards the second loading zone;
a first air stream passage in communication with the first loading zone so that particulate material in the first loading zone is able to enter the first air stream passage; and
a second air stream passage in communication with the second loading zone with the second loading zone so that particulate material in the second loading zone is able to enter the second air stream passage.

In a second aspect, a metering assembly as described above is provided where the flow controller is further operative to prevent particulate material entering the metering device through the inlet from being routed to either the first loading zone or the second loading zone.

In one embodiment, a metering assembly is provided wherein the flow controller comprises a metering auger with a first end and a second end.

In another embodiment, a metering assembly is provided wherein the flow controller comprises a metering roller with a first side and a second side.

In a second aspect, a method is provided for seeding a portion of land with one or more particulate materials using an air seeding apparatus having a metering assembly for metering out the one or more particulate material, the metering assembly comprising at least one metering device for receiving the one or more particulate material having a first loading zone and a second loading zone, comprising:
providing a flow controller in the at least one metering device operative for routing the at least one particulate material into either the first loading zone or the second loading zone;
operating the flow controller in a first direction when it is desirable to route the at least one particulate material into the first loading zone;
operating the flow controller in a second direction when it is desirable to route the at least one particulate material into the second loading zone; and
preventing the flow controller from operating in either the first or second direction when it is desirable to prevent the flow of particulate material into either the first loading zone or the second loading zone.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 10 is a top view of the metering device using an metering auger with multi-directional fighting; and FIG. 11 is a side section view of the metering device along sectional line FF' shown in FIG. 10.

FIG. 18 is a side view of another embodiment of a single metering device, in another aspect.

FIG. 19 is a perspective view of the metering device shown in FIG. 18.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
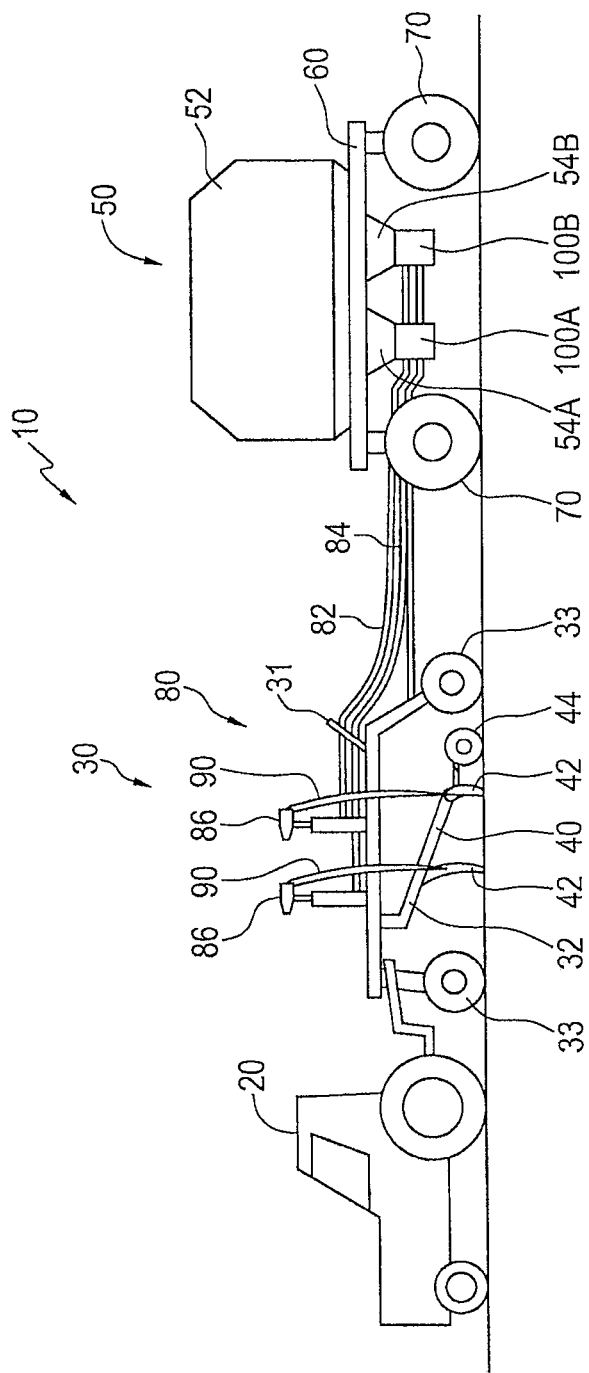
FIG. 1 is a schematic illustration of an air seeding system.

FIG. 1 illustrates an air seeding system 10 for seeding and/or fertilizing a field. The air seeding system 10 can include a tow vehicle 20, an air seeding apparatus 30; and a product cart 50.

The product cart 50 can have a tank 52 with two inner compartments (not shown), a frame 60 and transport wheels 70. The tank 52 can have outlets 54A, 54B provided at the bottom of the tank 52, with each outlet 54A, 54B being an outlet for a separate compartment. Metering assemblies 100A, 100B can be provided connected to the outlets 54A, 54B of the tank 52 so that particulate material, such as seed, fertilizer, etc. can be fed from the tank 52 through the outlets 54A, 54B to the metering assemblies 100A, 100B. The transport wheels 70 allow the product cart 50 to be pulled through a field by the tow vehicle 20.

The air seeding apparatus 30 is used to inject particulate material supplied from the product cart 50 into the ground. The air seeding apparatus 30 typically contains a tool bar frame 31 with transport wheels 33 and a number of openers 32 connected to the tool bar frame 31. The openers 32 can have an arm member 40, soil engaging members 42 and a guide wheel 44 provided thereon. For example, one soil engaging member 42 could be a seed knife and the other soil engaging member 42 could be a fertilizer knife.

A pneumatic distribution system 80 can be used to route particulate material from the product cart 50 to the air seeding apparatus 30 where the particulate material will be further routed to one of the openers 32, where the particulate material will be injected into the ground through one of the soil engaging members 42. First distribution lines 82 and second distribution lines 84 can route particulate material from the metering assemblies 100A and 100B, respectively, to the air seeding apparatus 30, where the particulate material will be routed to a distribution head 86. From the distribution head 86 the particulate material can be routed through secondary distribution lines 90 to the ground engaging members 42 and into the ground.

The air seeding apparatus 30 can be hitched to a tow vehicle 20, such as an agricultural tractor, so that the tow vehicle 20 can tow the air seeding apparatus 30 through a field to be seeded and/or fertilized. The product cart 50 can be hitched to the air seeding apparatus 30 so that the tow vehicle 20 tows both the air seeding apparatus 30 and the product cart 50. Alternatively, the product cart 50 can be used in a tow between configuration with the tow vehicle 20 towing the product cart 50 which is then followed by the air seeding apparatus 30.

Figure 2:
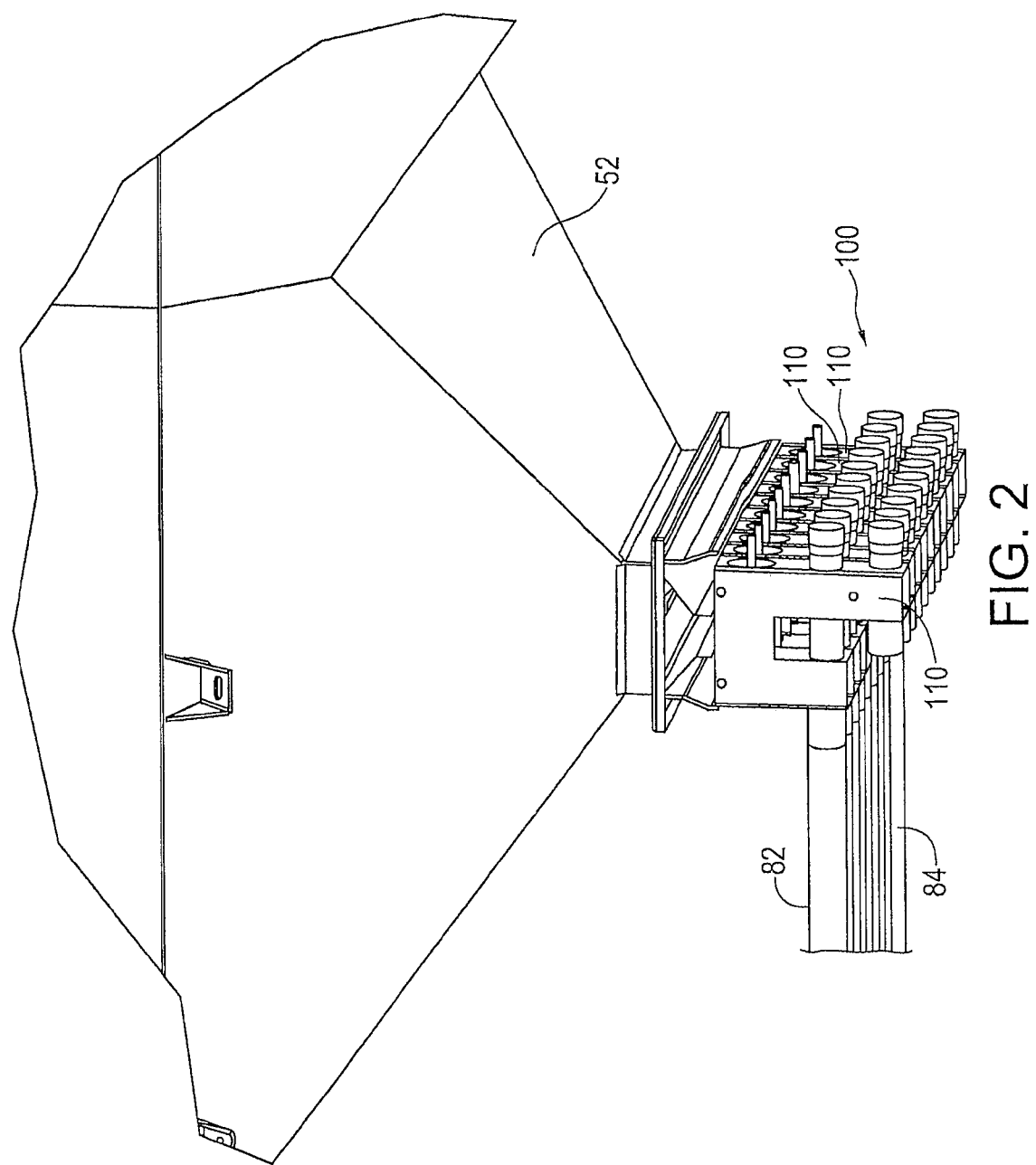
FIG. 2 is a perspective illustration of a metering assembly.
Figure 3:
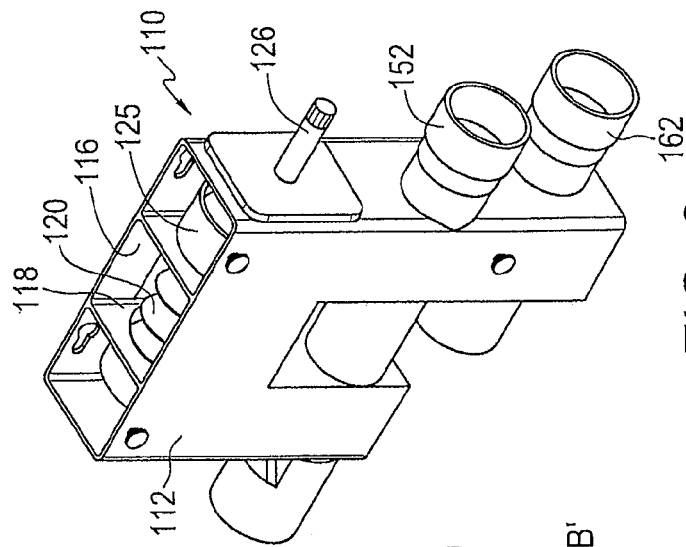
FIG. 3 is a perspective view of a single metering device.
Figure 4:
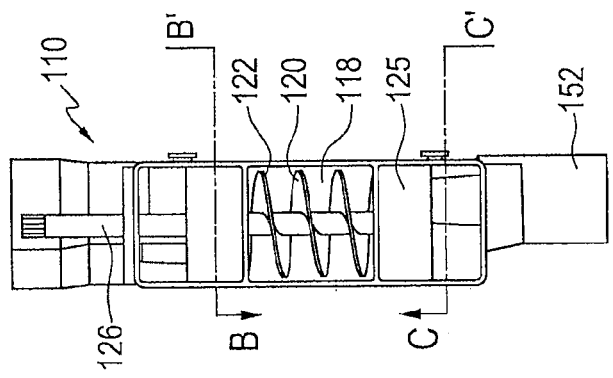
FIG. 4 is a top view of the metering device shown in FIG. 3.
Figure 5:
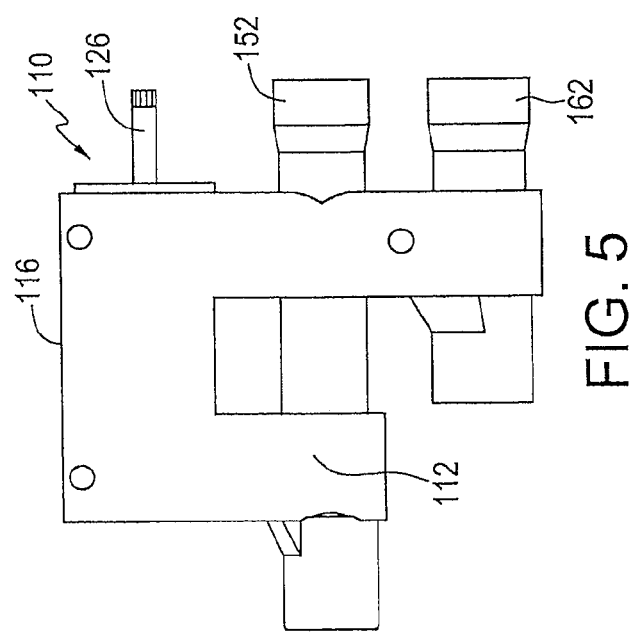
FIG. 5 is a side view of the metering device shown in FIG. 3.

FIG. 2 illustrates a metering assembly 100 in one aspect. The modular metering assembly 100 can be made up of a plurality of module metering devices 110, where each metering device 110 can be used to selectively supply particulate material, such as grain, etc. from the product tank 52 to the first distribution lines 82 and the second distribution lines 84 and subsequently to the air seeding apparatus 30 shown in FIG. 1.

FIGS. 3-9 illustrate various views of a single metering device 110 in the metering assembly 100. The metering device 110 has a housing 112, an inlet 116, flow controller 118 including a metering auger 120 with flighting 122 wrapped around a portion of auger drive shaft 126, a first loading zone 130 and a second loading zone 140.

The inlet 116 is positioned so that particulate material from the product tank 52 that passes out of the outlet 54 can enter the metering device 110 and fall into contact with the metering auger 120 of the flow controller 118. An auger drive shaft 126 can be connected to the metering auger 120 to drive a rotation of the metering auger 120. The auger drive shaft 126 can be connected to an electric motor, hydraulic motor, PTO, etc. (not shown). In the alternative, the metering auger 120 can be ground driven by wheel 70 on the cart frame.

In one embodiment, a plurality of metering augers 120 can be driven by a common drive shaft (not shown) having individual clutches between the common drive shaft and the individual auger drive shafts 126 of each metering auger 120. The common drive shaft can be connected to an electric motor, hydraulic motor, PTO, etc. (not shown). In the alternative, the common drive shaft can be ground driven by wheel 70 on the cart frame. Alternatively, each auger drive shaft 126 can be driven by its own electric motor or hydraulic motor.

The first loading zone 130 can be positioned proximate a first end 121 of the metering auger 120 and the second loading zone 140 can be proximate a second end 123 of the metering auger 120. In one aspect, the first loading zone 130 can be positioned below the first end 121 of the metering auger 120 so that particulate material that has been moved to the first end 121 of the metering auger 120 will drop into the first loading zone 130. Similarly, the second loading zone 140 can be positioned below the second end 123 of the metering auger 120 so that particulate material that has been moved to the second end 123 of the metering auger 120 can drop into the second loading zone 140.

Figure 7:
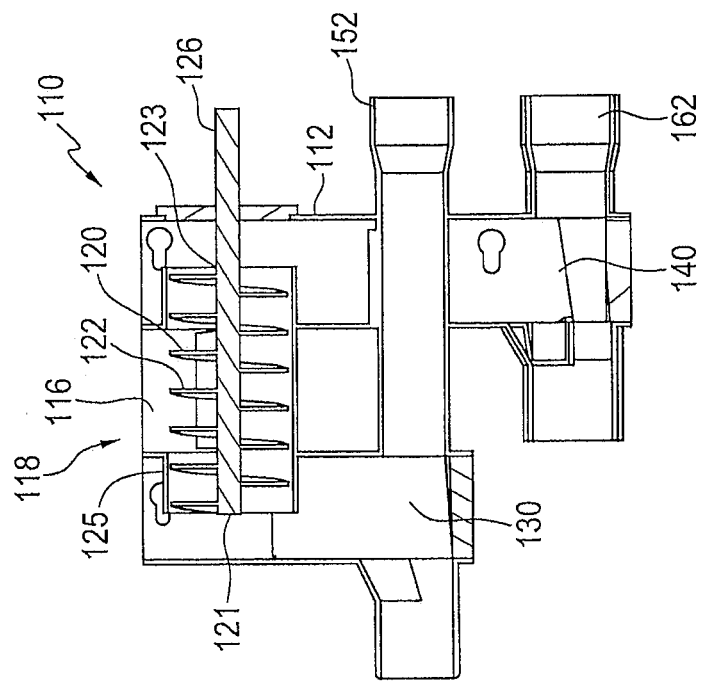
FIG. 7 is a side sectional view of the metering device along sectional line AA' shown in FIG. 6.

In the embodiment shown in FIG. 7, the first loading zone 130 and the second loading zone 140 are spaced apart, however, it is understood that the loading zones need not necessarily be spaced.

A first air stream passage 152 can be provided relative to the first loading zone 130 so particulate matter that is directed to the first loading zone 130 can enter into the first air stream passage 152 where it will be carried by the first distribution lines 82 shown in FIGS. 1 and 2 to the air seeding apparatus 30. Similarly, a second air stream passage 162 can be provided relative to the second loading zone 140 so that particulate material that is directed to the second loading zone 140 enters into the second air stream passage 162 and can be carried through second distribution lines 84 (not shown) to an air seeding apparatus 30.

The first air stream passage 152 can be connected to one of the first distribution lines 82 and the second air stream passage 162 can be connected to one of the second distribution lines 84 shown in FIG. 2.

Figure 9:
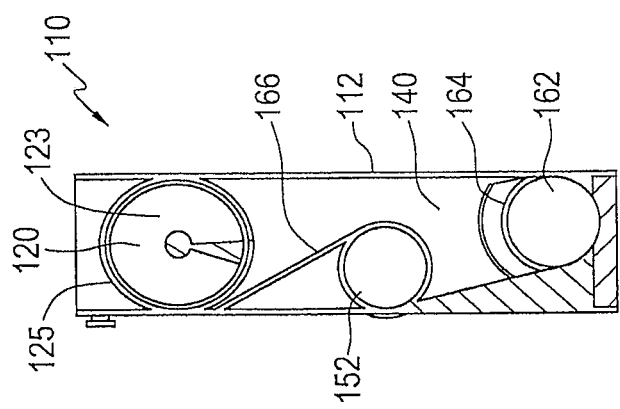
FIG. 9 is a sectional view of the metering device along sectional line CC' shown in FIG. 4
Figure 12:
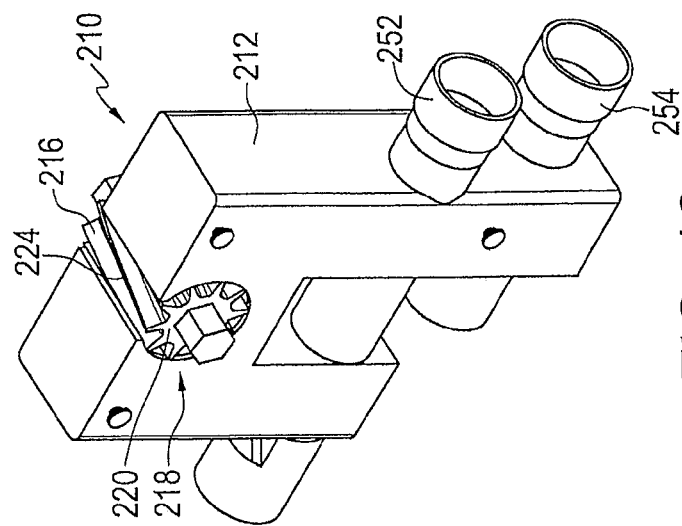
FIG. 12 is a perspective view of a single metering device, in another aspect.

In one aspect, the first air stream passage 152 could be a section of conduit that passes through the first loading zone 130. An opening 154, shown in FIG. 8, can be provided in the first air stream passage 152 where the first air stream passage 152 passes through the first loading zone 130, allowing particulate material in the first loading zone 130 to pass through the opening 154 and into the first air stream passage 152. Optionally, a deflector plate 156 can be used to deflect particulate material entering the first loading zone 130 through the opening 154 and into the first air stream passage 152. Similarly, the second air stream passage 162 could also be a section of conduit having an opening 164 where the second air stream passage 162 passes through the second loading zone 140, as shown in FIG. 9. This allows particulate material that has been directed to the second loading zone 140 to pass into the second air stream passage 162 through the opening 164. Optionally, a deflector plate 166 can be used to deflect particulate material entering the second loading zone 130 through the opening 164 and into the second air stream passage 162.

Figure 6:
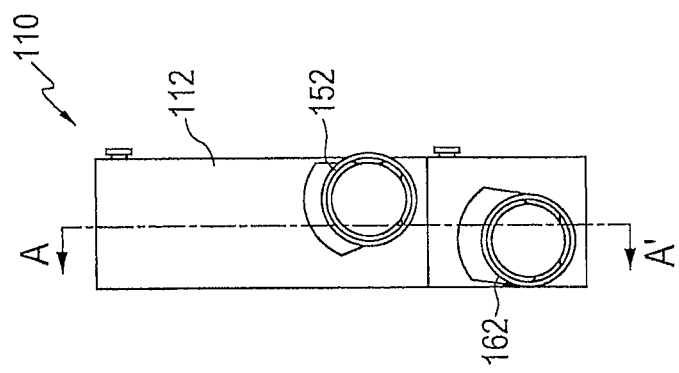
FIG. 6 is a front view of the metering device shown in FIG. 3.
Figure 8:
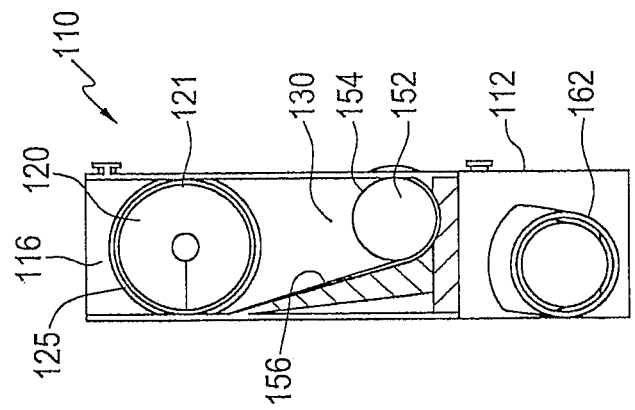
FIG. 8 is a section view of the metering device along sectional line BB' shown in FIG. 4.

In one aspect, the first air stream passage 152 may be provided above the second air stream passage 154 and the first air stream passage 152 may pass through the housing 112 above the second loading zone 140. As shown in FIG. 6, the first air stream passage 152 can be positioned slightly to the side of the second air stream passage 162 to allow particulate material that has been routed to the second end 123 of the metering auger 120 to fall past the first air stream passage 152 to the second loading zone 140. The section of the first air stream passage 152 that passes above the second loading zone 140 will not have any openings, preventing particulate material that was routed to the second end 123 of the metering auger 120 from entering the first air stream passage 162.

In one aspect, an auger housing 125 can be enclosing the metering auger 120. The inlet 116 can pass through this auger housing 125 and the auger housing 125 can be open at the first end 121 and the second end 123 of the metering auger 120. As shown in FIG. 10, an inside surface 127 of the auger housing 125 can be positioned adjacent to an outside periphery of the flighting 122 of the metering auger 120, preventing particulate material from passing between the flighting 122 of the metering auger 120 and the inside surface 127 of the auger housing 125. This can prevent particulate material that has entered the metering device 110 through the inlet 116 from reaching either the first loading zone 130 or the second loading zone 140 when the metering auger 120 is not rotating.

In operation, particulate material can enter the metering device 110 through the inlet 116 from the outlet 54 of the product tank 52, where the particulate material will come into contact with the metering auger 120. If the fighting 122 of the metering auger 120 is all in the same direction (i.e. either all left hand along the length of the metering auger 120 or all in the right hand direction), by rotating the metering auger 120 in one direction using the auger drive shaft 126, the particulate material entering the metering device 110 can be selectively supplied to either the first air stream passage 152 or the second air stream passage 162. By rotating the metering auger 120 in a first direction, particulate material can be moved towards the first end 121 of the metering auger 120 to the first loading zone 130 and then into the first air stream passage 152. By rotating the metering auger 120 in a second direction, opposite to the first direction, the particulate material can be moved towards the second end 123 of the metering auger 120 to the second loading zone 140 and into the second air stream passage 162. If the metering auger 120 is stopped from rotating, the particulate material will not be directed to either the first end 121 or the second end 123 of the metering auger 120 and the particulate material will not be supplied from the metering device 110 to the air seeding apparatus 30, shown in FIG. 1.

Referring to FIGS. 10 and 11, if the metering device 110 is provided with a metering auger 170 that has flighting 172 that is in a first direction (i.e. right hand) along a first portion 176 of the length of the metering auger 170 and fighting 175 along a second portion 178 of the length of the metering auger 170 that is in an opposite direction, particulate material can be moved to both the first end 171 and the second end 173 of the metering auger 170, simultaneously, by rotating the metering auger 170. The relative pitch angle of flighting 172 and fighting 175 will determine the amount of particulate material that is directed to the first end 171 of the metering auger 170 relative to the amount of particulate material that is directed to the second end 173 of the metering auger 170. For example, if fighting 172 and fighting 175 have substantially the same pitch angle, substantially equal amounts of particulate material can be provided to the first end 171 and the second end 173 of the metering auger 170, simultaneously. However, if one of these flighting 172, 175 has a steeper pitch angle than the other, more particulate material can be directed to one of the first end 171 or the second end 173 of the metering auger 170, relative to the other end.

In the alternative, differing amounts of particulate material can be dispensed in each direction by having a metering auger where the drive shaft portion of flighting 172 or flighting 175 has a larger diameter than the other drive shaft portion such that the volume of particulate material dispensed in each direction can be varied.

Referring again to FIGS. 1-11, a metering device 110 with a metering auger 120 having one type of flighting, for example, flighting having a steep pitch angle, may be replaced with a different metering auger 120 having flighting with a different pitch angle to suit the particular requirements of a user. In the alternative, a metering auger 120 having fighting that is all in one direction may be removed from the metering device 110 and replaced with another metering auger 120 having flighting in opposite directions. In this manner, the metering auger 120 for metering device 110 can be selected based on whether a user desires all of the particulate material to be routed to one of the first loading zone 130 and the second loading zone 140 or whether they want particulate material to be routed to both the first loading zone 130 and the second loading zone 140, simultaneously. This can also allow a user to modify the amount of particulate material that is routed to the first loading zone 130 relative to the second loading zone 140, when particulate material is being routed to both loading zones 130, 140 simultaneously.

In one aspect, where a metering assembly having a plurality of metering devices is provided and it is desirable that less or more product is released from that particular metering assembly, one or more of the metering augers in the metering assembly can comprise flighting having a different pitch angle, i.e., either a steeper or less steep pitch angle. Thus, the amount of product distributed from the metering assembly can be controlled, depending upon how many openers are being serviced by the metering assembly.

Referring to FIG. 2 the different metering devices 110 in the metering assembly 100 can be operated independently of one another to selectively control which of the metering device 110 are operating in the metering assembly 100 and allow some of the metering devices 110 to be supply particulate material from the tank 52 to the first distribution lines 82 or second distribution lines 84 while other metering devices 110 are preventing particulate material from reaching either the first distribution line 82 or the second distribution line 84 by not rotating the augers in these metering devices, for example, in an instance where there may be seeding overlap and the user wishes to only seed a portion of the field.

FIGS. 12-17 illustrate a metering device 210 in another aspect. Metering device 210, similar to metering device 110 shown in FIGS. 3-9, can be used in a metering assembly 100 and has a first loading zone 230, a second loading zone 240, an inlet 216 and a flow controller 218, however, the flow controller 218 of the metering device 210 includes a metering roller 220 provided between the inlet 216 and the first loading zone 230 and the second loading zone 240.

Figure 13:
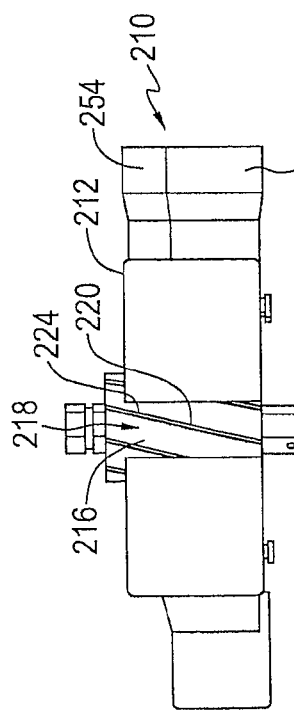
FIG. 13 is a top view of the metering device shown in FIG. 10.
Figure 14:
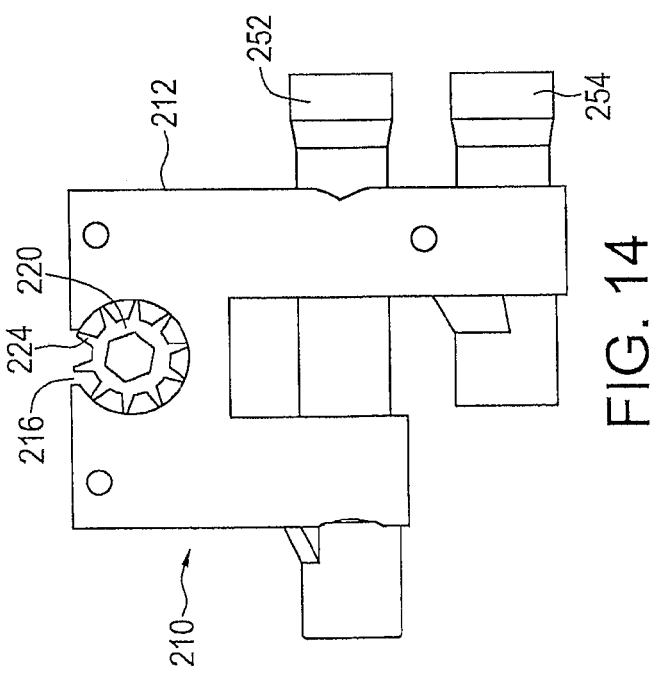
FIG. 14 is a side view of the metering device shown in FIG. 10.

The first loading zone 230 can be provided on a first side 221 of the metering roller 220, while the second loading zone 240 can be provided on a second side 223 of the metering roller 220. The metering roller 220 can extend across the width of the metering device 210 defining an axis of rotation. The metering roller 220 can be made of a variety of materials and have a variety of straight, fluted or toothed configurations to correspond to the various crops that may need seeding and/or fertilizing. In one aspect, the metering roller 220 can have a series of ridges 224 extending along the length of the metering roller 220. In one aspect, these ridges 224 can be angled relative to the angle of rotation of the metering roller 220, as shown in FIG. 13.

Figure 17:
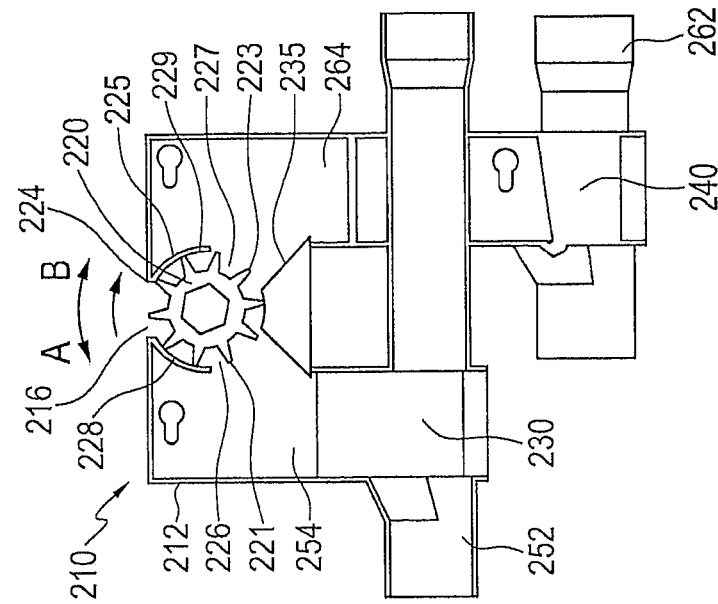
FIG. 17 is a side sectional view of the metering device along sectional line EE' shown in FIG. 15.

In operation, when the metering roller 220 is rotated in a first direction, A, shown in FIG. 17, particulate material entering the inlet 216 of the metering device 210 from the product tank 52 can be carried by the metering roller 220 to the first side 221 of the metering roller 220 where it will be directed to the first loading zone 230. In a similar manner, when the metering roller is rotated in a second direction, B, shown in FIG. 17, particulate material entering the inlet 216 of the metering device 210 from the product tank 52 can be carried by the metering roller 220 to the second side 223 of the metering roller 220 where it will be directed to the second loading zone 240.

In one embodiment, the first loading zone 230 and the second loading zone 240 can be spaced apart, however, it is understood that the loading zones need not necessarily be spaced.

A first air stream passage 252 can be provided relative to the first loading zone 230 so particulate matter that is directed to the first loading zone 230 by the metering roller 220 can enter into the first air stream passage 252 where it will be carried by the first distribution lines 82 shown in FIGS. 1 and 2 to the air seeding apparatus 30. Similarly, a second air stream passage 262 can be provided relative to the second loading zone 240 so that particulate material that is directed to the second loading zone 240 by the metering roller 220 enters into the second air stream passage 262 and can be carried through second distribution lines 84 (not shown) to an air seeding apparatus 30.

Figure 16:
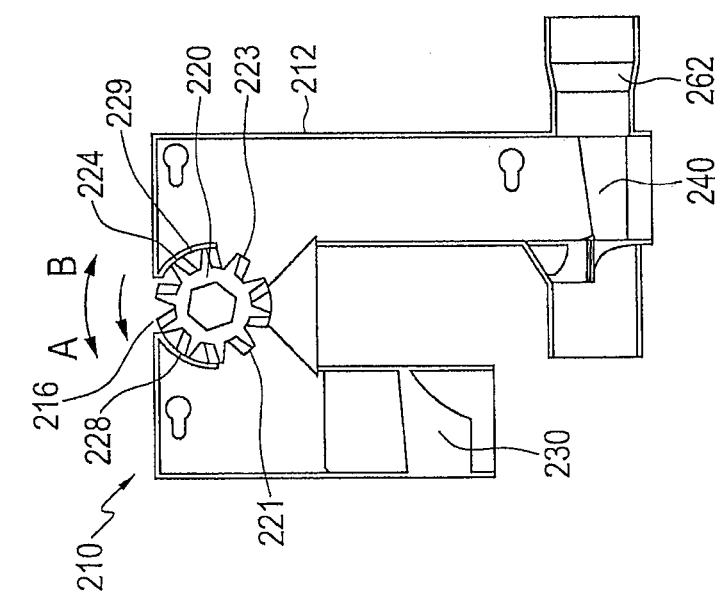
FIG. 16 is a side section view of the metering device along sectional line DD' shown in FIG. 15.
Figure 15:
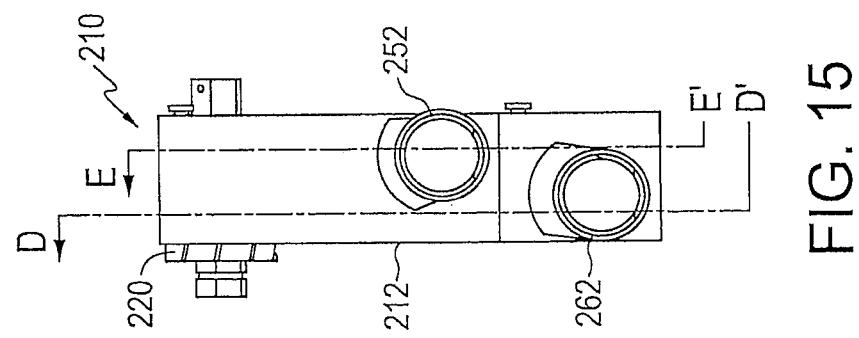
FIG. 15 is a front view of the metering device shown in FIG. 10.

In one aspect, the first air stream passage 252 could be section of conduit that passes through the first loading zone 230. An opening 254, shown in FIG. 17, can be provided in the first air stream passage 252 where the first air stream passage 252 passes through the first loading zone 230, allowing particulate material in the first loading zone 230 to pass through the opening 254 and into the first air stream passage 252. Similarly, the second air stream passage 262 could also be a section of conduit having an opening 264 where the second air stream passage 262 passes through the second loading zone 240, as shown in FIG. 16. This allows particulate material that has been directed to the second loading zone 240 to pass into the second air stream passage 262 through the opening 264.

In one aspect, a roller housing 225 can be provided in the housing 212 partially enclosing the metering roller 220. The inlet 216 can pass through the roller housing 225 allowing particulate material from the product tank 52 to pass through the roller housing 225 and come into contact with the metering roller 220. A first aperture 226 can be provided in the roller housing 225 so that particulate material moved by the metering roller 220 to the first side 221 of the metering roller 220 can exit the roller housing 225 and pass into the first loading zone 230, while a second aperture 227 can be provided in the roller housing 225 so that particulate material moved by the roller meter 220 can pass out of the roller housing 225 and into the second loading zone 240. A first portion 228 of the roller housing 225 and a second portion 229 of the roller housing can be provided between the inlet 216 and the first aperture 226 and the second aperture 227, respectively. The first portion 228 and the second portion 229 of the roller housing 225 can be provided in close proximity to the metering roller 220. In this manner, when the metering roller 220 is not being rotated, particulate material passing through the inlet 216 of the metering device 210 and coming into contact with the metering roller 220, will be prevented from passing into the first loading zone 230 and the second loading zone 240 by the first portion 228 and the second portion 229 of the roller housing 225.

If the metering roller 220 is provided with ridges 224 angled relative to the axis of rotation of the metering roller 220, the angled ridges 224 can be used to try and prevent particulate material from being jammed between the ridges 224 and the first portion 228 and the second portion 229.

In one aspect, a deflector plate 235 can be provided beneath the metering roller 220 to deflect particulate material to the first loading zone 230 from the first side 221 of the metering roller 220 and to the second loading zone 240 from the second side 222 of the metering roller 220.

In operation, particulate material can enter the metering device 210 through the inlet 116 from the outlet 54 of the product tank 52 and into contact with the metering roller 220. If the metering roller 220 is not being rotated, the metering roller 220 can prevent the particulate material from passing to either of the first loading zone 230 and the second loading zone 240 and into the first air stream passage 252 and the second air stream passage 262, respectively. If the metering roller 220 is rotating in a first direction, A, the particulate material can be directed to the first loading zone 230 where it will enter the first air stream passage 252 and subsequently be routed to the air seeding apparatus 30 (shown in FIG. 1) to be deposited into the ground. If the metering roller 220 is being rotated in a second direction, B, the particulate material coming into contact with the metering roller 220 can be directed by the metering roller 220 to the second loading zone 240 where it will enter the second air stream passage 262 and be subsequently routed to the air seeding apparatus 30 shown in FIG. 1. In this manner, the metering device 210 can selectively supply particulate material to either the first air stream passage 252 or the second air stream passage 262 based on the direction of rotation of the metering device 210. Additionally, the metering device 220 can be used to prevent particulate material from being supplied to the air seeding apparatus 30 for injection into the ground, by stopping the metering roller 220 from rotating.

In one aspect, if each metering device 210 in a metering assembly 100 can be selectively rotatable relative to the other metering devices 210, the metering assembly 100 can be used to selectively supply particulate material from some of the metering devices 210 while the other metering devices 210 are preventing particulate material from reaching the first distribution lines 82 or the second distribution lines 84.

In one aspect, the metering assembly comprises more than one metering roller, each having a plurality of radially extending ridges defining product receiving valleys having a volume, and each metering roller dispensing a specific volume of the granular product per rotation, wherein at least one metering roller has receiving valleys of a different volume than the other metering rollers for reducing or increasing the overall volume of the granular product dispensed from the metering assembly.

FIGS. 18-19 illustrate a metering device 310 in another aspect. Metering device 310, similar to metering devices 110/210 shown previously, can be used in a metering assembly 100 and has a first loading zone 330, a second loading zone 340, an inlet 316 and a flow controller 318, however, the flow controller 318 of the metering device 310 includes a belt 320 provided between the inlet 316 and the first loading zone 330 and the second loading zone 340. In one aspect, belt 320 comprises ridges 391 forming a plurality of valleys 392 for receiving seed. Belt 320 wraps around two rollers 393 and 394, respectively. Rollers 393/394 can be rotated in both directs as explained in more detail below.

Belt 320 can extend across the width of the metering device 310 so that one end extends to the first loading zone 330 and the second end extends to the second loading zone 340. The belt 320 can be made of a variety of materials such as rubber and have a variety of surface configurations (i.e., ridges and valleys) to correspond to the various crops that may need seeding and/or fertilizing. In one aspect, the belt 320 can be smooth without any ridges and valleys.

In operation, when the belt 320 is operating in a first direction, A, particulate material entering the inlet 316 of the metering device 310 from the product tank 52 can be carried by the belt 320 to the first side 321 of the metering device 310 where it will be directed to the first loading zone 330. In a similar manner, when the belt 320 is operating in a second direction, B, particulate material entering the inlet 316 of the metering device 310 from the product tank 52 can be carried by the belt 320 to the second side 323 of the metering device 310 where it will be directed to the second loading zone 340.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A metering assembly for use with an air seeding system for delivering one or more particulate materials to an air seeding apparatus, the air seeding system comprising a product tank, configured to hold a particulate material and having an outlet, the metering assembly comprising:
at least one metering device, each metering device having:
a housing,
an inlet positioned in the housing to receive particulate material from the outlet of the product tank,
a first loading zone and a second loading zone, and
a rotatable flow controller provided at or near the inlet and operative to route particulate material that has entered the metering device through the inlet to either the first loading zone or the second loading zone, whereby when the flow controller is rotating in a first direction, particulate material is routed only to the first loading zone and when the flow controller is rotating in a second direction, particulate material is routed only to the second loading zone;
a first air stream passage in communication with the first loading zone so that when particulate material is routed to the first loading zone, the particulate material enters the first air stream passage which then feeds the particulate material to a first soil engaging member; and
a second air stream passage in communication with the second loading zone so that when particulate material is routed to the second loading zone, the particulate material enters the second air stream passage which then feeds the particulate material to a second soil engaging member.

2. The metering assembly of claim 1 wherein when the rotatable flow controller is not rotating it prevents particulate material entering the metering device through the inlet from being routed to either the first loading zone or the second loading zone.

3. The metering assembly of claim 1 wherein the rotatable flow controller comprises a metering auger with a first end and a second end.

4. The metering assembly of claim 3 wherein the first loading zone is positioned below the first end of the metering auger and the second loading zone is positioned below the second end of the metering auger.

5. The metering assembly of claim 3 wherein the first loading zone is horizontally spaced apart from the second loading zone.

6. The metering assembly of claim 5 wherein the first loading zone and the second loading zone are spaced a distance apart, the distance corresponding to at least a portion of the metering auger.

7. The metering assembly of claim 3 wherein an auger housing is provided around the metering auger having an opening at the first end of the metering auger and an opening at a second end of the metering auger, the auger housing having an inner surface positioned adjacent to the outer periphery of flighting of the metering auger.

8. The metering assembly of claim 3 wherein an opening in the first air stream passage places the first air stream passage in communication with the first loading zone and an opening in the second air stream passage places the second air stream passage in communication with the second loading zone.

9. The metering assembly of claim 1 wherein the rotatable flow controller is a metering roller.

10. The metering assembly of claim 9 wherein the first loading zone is positioned below a first side of the metering roller and the second loading zone is positioned below a second side of the metering roller.

11. The metering assembly of claim 9 wherein the first loading zone is separated from the second loading zone.

12. The metering assembly of claim 11 wherein the first loading zone and the second loading zone are spaced a distance apart, the distance corresponding to at least a portion of the metering roller.

13. The metering assembly of claim 9 wherein the metering roller has a plurality of ridges.

14. The metering assembly of claim 13 wherein the ridges on the metering roller are angled relative to an axis of rotation defined by the metering roller.

15. The metering assembly of claim 10 wherein a roller housing is provided around the metering roller with an opening on the first side of the metering roller and an opening on the second end of the metering roller, the roller housing having an inner surface positioned adjacent to the outer periphery of the metering roller.

16. The metering assembly of claim 1 wherein the rotatable flow controller comprises a belt.

17. A product tank for dispensing particulate material having a particulate material metering assembly as claimed in claim 1.

18. The metering assembly of claim 1 comprising a plurality of metering devices, each metering device having its own rotatable flow controller, whereby the rotatable flow controllers of the plurality of metering devices are driven by a common shaft and the common shaft is operated by means of an electric motor or a hydraulic motor.

19. The metering assembly of claim 18, whereby each rotatable flow controller further comprises its own individual drive shaft.

20. The metering assembly of claim 19, wherein each rotatable flow controller further comprises a clutch between the common shaft and its individual drive shaft.

21. The metering assembly of claim 1, whereby the rotatable flow controller is operated by means of an electric motor or a hydraulic motor.

22. The metering assembly of claim 1 comprising a plurality of metering devices, each metering device having its own rotatable flow controller, whereby each rotatable flow controller further comprises its own individual drive shaft.

23. The metering assembly of claim 22, wherein each individual drive shaft is operated by means of an electric motor or a hydraulic motor.

24. The metering assembly of claim 22, wherein each rotatable flow controller further comprises a clutch on its individual drive shaft.

25. A method for seeding a portion of land with one or more particulate materials using an air seeding apparatus having a metering assembly for metering out the one or more particulate material, the metering assembly comprising at least one metering device for receiving the one or more particulate material having a first loading zone and a second loading zone, comprising:
   providing a rotatable flow controller in the at least one metering device operative for routing the at least one particulate material into either the first loading zone or the second loading zone;
   rotating the rotatable flow controller in a first direction when it is desirable to route the at least one particulate material into the first loading zone;
   rotating the rotatable flow controller in a second direction when it is desirable to route the at least one particulate material into the second loading zone; and
   preventing the rotatable flow controller from rotating in either the first or second direction when it is desirable to prevent the flow of particulate material into either the first loading zone or the second loading zone.